(12) United States Patent
Su

(10) Patent No.: US 7,872,453 B2
(45) Date of Patent: Jan. 18, 2011

(54) CUSTOMER INTELLIGENT REACTIVE POWER AUTOMATIC COMPENSATION ENERGY-SAVED DEVICE

(76) Inventor: Ruitian Su, #302, Building 8, Qiao Yi Garden, Gong Bei, Zhuhai, Guangdong 519020 (CN)

( * ) Notice: Subject to any disclaimer, the term of this patent is extended or adjusted under 35 U.S.C. 154(b) by 332 days.

(21) Appl. No.: 12/067,824

(22) PCT Filed: Sep. 21, 2006

(86) PCT No.: PCT/CN2006/002481

§ 371 (c)(1),
(2), (4) Date: Mar. 24, 2008

(87) PCT Pub. No.: WO2007/033599

PCT Pub. Date: Mar. 29, 2007

(65) Prior Publication Data

US 2008/0203979 A1     Aug. 28, 2008

(30) Foreign Application Priority Data

Sep. 26, 2005    (CN)    .................... 2005 2 0064967 U

(51) Int. Cl.
*G05F 1/70*    (2006.01)
(52) U.S. Cl. ..................................... 323/209
(58) Field of Classification Search .................. 323/205, 323/208, 209, 210
See application file for complete search history.

(56) References Cited

FOREIGN PATENT DOCUMENTS

| CN | 1004111 | 5/1989 |
|---|---|---|
| CN | 2276680 | 3/1998 |
| CN | 1560978 | 1/2005 |
| CN | 1794535 | 6/2006 |
| CN | 2836307 | 11/2006 |

*Primary Examiner*—Gary L Laxton
(74) *Attorney, Agent, or Firm*—Schmeiser, Olsen & Watts, LLP

(57) ABSTRACT

A power supply compensation, particularly relating to a customer intelligent reactive power automatic compensation energy-saved device, which includes an intelligent reactive power compensation regulator, a plurality of branch capacitor control contactors, a plurality of capacitor banks and a current transformer. The intelligent reactive power compensation regulator is provided with a sampling current input, a sampling voltage input, an external AC contactor power bus and a plurality of output control lines, the sampling current input is connected to the current transformer, the sampling voltage input is connected to the power supply, the external AC contactor power bus is connected to a live wire of the power supply, the capacitor banks are connected to the power supply through the branch capacitor control contactors.

18 Claims, 3 Drawing Sheets

CUSTOMER INTELLIGENT REACTIVE POWER AUTOMATIC COMPENSATION ENERGY-SAVED DEVICE

FIELD OF THE INVENTION

The present invention relates to a power supply compensation. More specifically, the present invention relates to a customer intelligent reactive power automatic compensation energy-saved device.

BACKGROUND OF THE INVENTION

Electric energy is the clearest and environmentally friendly energy which is also used easily and efficiently, and is transmitted and controlled expediently.

The inductance load resistance produces reverse electromotive force for AC, so the current has a delay of 90 degrees phase angle comparing to the voltage, but the current of capacitive load leads the voltage by 90 degrees phase angle. According to this principle, the phase angle between the current and voltage in a general circuit will be reduced if a capacitor is connected in parallel to the inductance load. When $\cos \phi = 1$, the current and the voltage have the same phase angle and the circuit equaling to a pure resistance. This can be achieved by paralleling a capacitor appropriately in the circuit. Such a situation is called paralleling resonance or current resonance and can achieve compensating reactive power (shown in FIG. 1, which is also called a reactive power compensation schematic diagram, and shows a parallel resonance or a current resonance circuit). When in a situation of current resonance, the current in the inductance and capacitor circuit is Q times as much as the current of power supply:

$$Q = \omega L / R$$

$$\omega^2 = 1/LC$$

Resonance frequency: $f_0 =$ $$\frac{1}{2\pi} \sqrt{\frac{1}{LC}}$$

Over-resonance current may damage the circuit. The current $I_L$ of inductance branch does not change too much after a capacitor is connected in parallel. Only the general circuit changes after a parallel connection between the inductance and capacitor, which raises the total power factor. The reactive current $I_{L1}$ from the inductance flows into the capacitor and is stored in the capacitor, and the capacitor relieves electricity and feedback to the power supply while the inductance needs electricity. Since the flowing direction of $I_{L1}$ is opposite to $I_C$, the current $I_0$ from the power supply will be decreased and electricity power will be saved. FIG. 2 is a phase diagram of the current and the voltage, and FIG. 3 is a power triangle diagram; $\phi_C$ represents a leading phase angle of capacitor and $\phi_L$ represents a retarding phase angle of inductance in FIG. 2.

The induction-motor, transformer and fluorescent lamp in the common agricultural equipment, such as water pump or oxygen machine, are inductance loads, and there will be an angular phase difference between the current and voltage in the circuit when the equipments being used. The larger angular phase difference becomes, the lower the power factor will be. The following can be known according to FIG. 2 and FIG. 3:

Before paralleling capacitor $$\cos \phi = P/S = P/UI_0$$

$$I_L = I_0$$

$$I_L = P/U \cos \phi$$

Reactive power $$Q = S \sin \phi = UI_0 \sin \phi$$

$$Q = UI_{L1}$$

Reactive current through motor (amp.):

$$I_{L1} = I_0 \times \sin \phi = P \times \sin \phi / U \cos \phi$$

Current through capacitor (amp.):
after paralleling capacitor, general circuit $\cos \phi_0 \approx 1$, $\sin \phi_0 \approx 0$, so $$Ic \approx I_{L1}$$

Capacitance (ohm):

$$Xc = U/Ic$$

Capacitance (farad):

$$C = 1/\omega Xc$$

The disadvantages of low power factor are:
(1) The capacitance of power supply can not be made full use of.
(2) Power losses of the electricity transmission line, the electric generator and the transformer winding increase.
(3) Long distance transmitting electricity with low voltage causes unstable voltage. Paralleling appropriate capacitor in the inductance circuit is the most efficient and the simplest method for saving electricity.

PURPOSE OF THE INVENTION

It is a purpose of the present invention to provide a low-cost and electricity-saving customer intelligent reactive power automatic compensation energy-saved device.

SUMMARY OF THE INVENTION

The above purposes are realized in following technical solution:

A customer intelligent reactive power automatic compensation energy-saved device, including an intelligent reactive power compensation regulator, a plurality of branch capacitor control contactors, a plurality of capacitor banks and a current transformer; said intelligent reactive power compensation regulator is provided with a sampling current input, a sampling voltage input, an external AC contactor power bus and a plurality of output control lines; said sampling current input is connected to the current transformer, one end of said sampling voltage input is connected to a live wire of a power supply and the other end is connected to a zero phase line of the power supply, said external AC contactor power bus is connected to a live wire of the power supply, said current transformer is ringed around the live wire of the power supply, said output control lines are connected to the branch capacitor control contactors respective, said capacitor banks are connected to the power supply through the branch capacitor control contactors.

Said capacitor banks include at lease a first stage-one capacitor bank, and said first stage-one capacitor bank includes a plurality of branch stage-two capacitor banks the capacitance of which is increased by degrees.

Said capacitor banks include at lease a first stage-one capacitor bank and a second stage-one capacitor bank.

Said first stage-one capacitor bank includes a plurality of branch stage-two capacitor banks the capacitance of which is increased by degrees, and the capacitance of an after-branch capacitor bank is one time to two times as much as the capacitance of a former-branch capacitor bank.

Said second stage-one capacitor bank includes a plurality of branch stage-two capacitor banks with the same capacitance, the capacitance of said each branch stage-two capacitor bank is one time to two times as much as the maximum of capacitance of each branch stage-two capacitor bank in said first stage-one capacitor bank.

Said first stage-one capacitor bank includes a plurality of branch stage-two capacitor banks the capacitance of which is increased by degrees, the capacitance of an after-branch stage-two capacitor bank is two times as much as the capacitance of a former-branch stage-two capacitor bank; said second stage-one capacitor bank includes a plurality of branch stage-two capacitor banks with same capacitance, the capacitance of said each branch stage-two capacitor bank is two times as much as the maximum of capacitance of each branch stage-two capacitor bank in said first stage-one capacitor bank.

Said capacitor banks include a plurality of stage-one capacitor banks with the same capacitance; said stage-one capacitor banks include a plurality of branch stage-two capacitor banks the capacitance of which is increased by degrees.

Each stage-two capacitor bank includes three capacitors in parallel connection and the same capacitance.

Said stage-two capacitor banks can adopt in delta type parallel connection or star type parallel connection.

Said stage-two capacitor banks can be replaced by the single capacitors.

Compared with the prior art, the present invention can adjust the compensation reactive power by turning on and cutting off a plurality of capacitors, to reduce the power losses of electricity transmission line, its adjusting compensation precision achieve 1‰ or more of total reactive power, $\cos\phi=1$ and energy-saved are realized. The capacitance in the present invention is also increased by increasing progression of the $(N-1)^{th}$ power of 2 as a grads, which can make the adjusting precision achieve $1/(2^{(N-1)})$ or more of total reactive power.

DETAILED DESCRIPTION OF EXEMPLARY EMBODIMENTS

Figure 1:
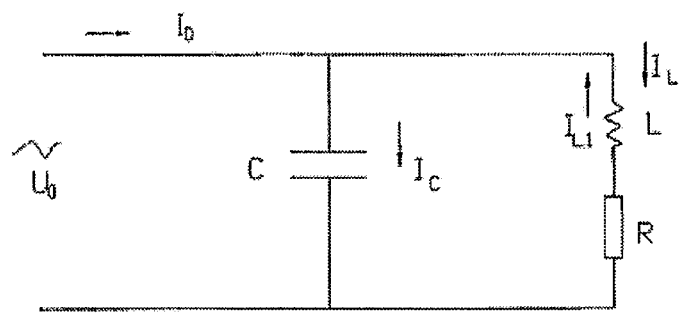
FIG. 1 is the reactive power compensation schematic diagram.
Figure 2:
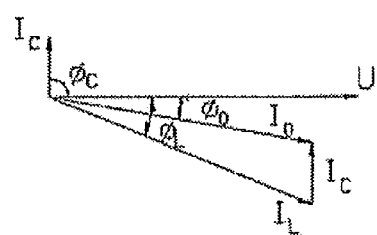
FIG. 2 is the phase diagram of the current and the voltage.
Figure 3:
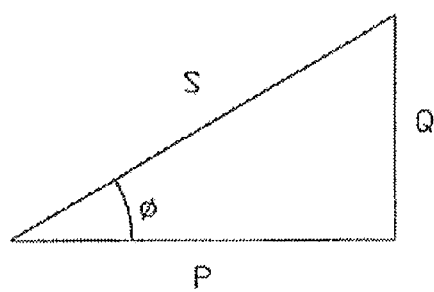
FIG. 3 is the power triangle diagram.
Figure 4:
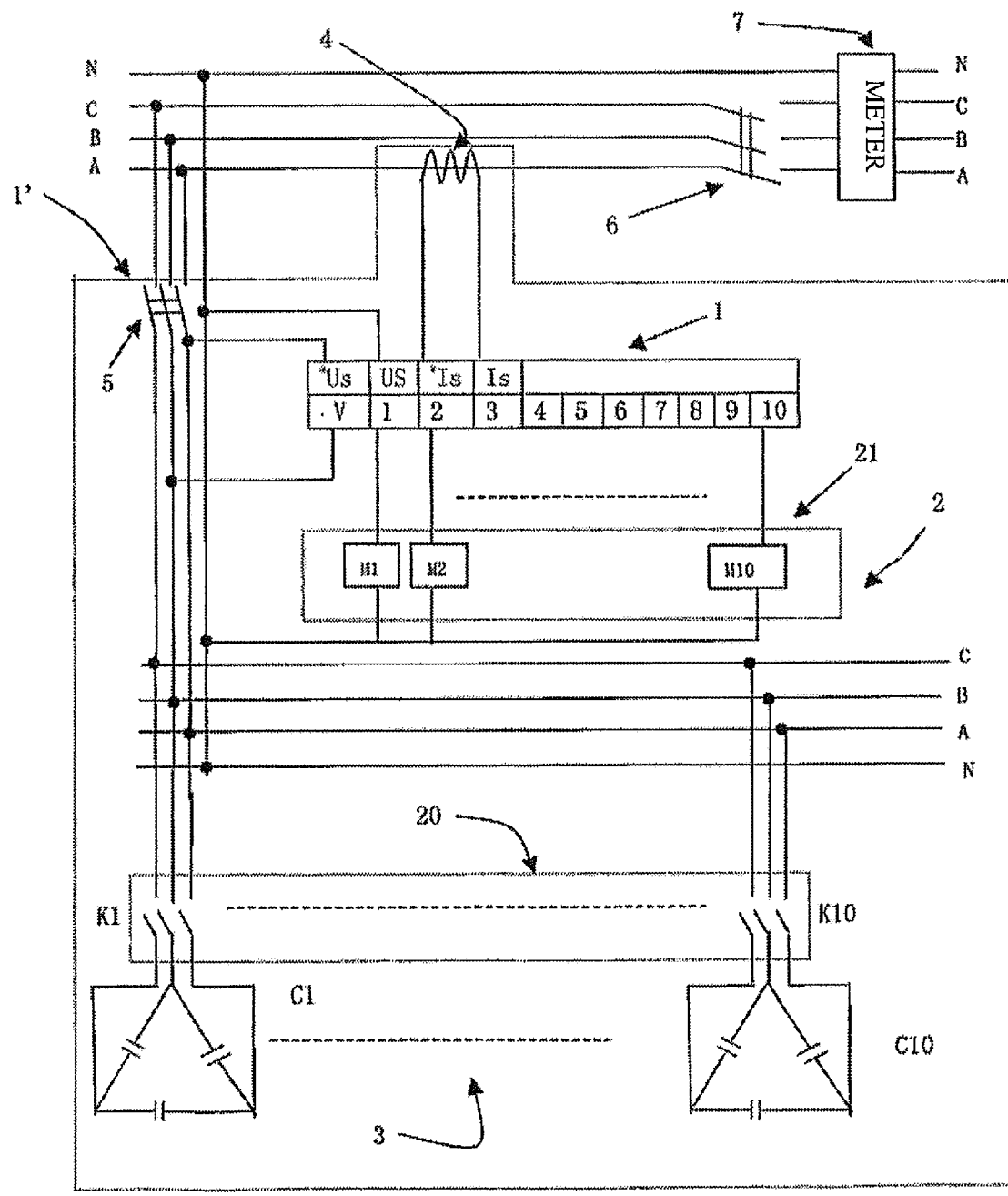
FIG. 4 is the internal connection schematic diagram of the customer intelligent reactive power automatic compensation energy-saved device.

With reference to FIG. 4, a customer intelligent reactive power automatic compensation energy-saved device 1' (it's called "energy-saved device 1'" for short below), including an intelligent reactive power compensation regulator 1, a plurality of branch capacitor control contactors 2, a plurality of capacitor banks 3 and a current transformer 4 is shown. Said intelligent reactive power compensation regulator 1 is provided with a sampling current input, a sampling voltage input, an external AC contactor power bus, a plurality of output control lines and control circuit (not shown), said sampling current input is connected to the current transformer 4. One end of said sampling voltage input is connected to a live wire of the power supply and the other end is connected to a zero phase line of the power supply. Said external AC contactor power bus is connected to a live wire of the power supply. Said current transformer 4 is ringed around the live wire of the power supply. Said output control lines are connected to the branch capacitor control contactors 2, respectively. The intelligent reactive power compensation regulator 1 is provided ten output control lines in this embodiment.

The energy-saved device 1' of the present invention also includes a main switch 5 inside and a case covered the energy-saved device 1' (not shown). The intelligent reactive power compensation regulator 1 can be replaced by a programmable controller or a computer. The general switch 6 and the electricity meter 7 for customers can be connected to said energy-saved device 1'.

To prevent someone from getting hurt by the capacitor banks 3 which accidentally relieves the electricity to the connect wire out of the case while power was cut, we can set a power-cut protecting contactor (not shown) inside said energy-saved device 1'. The power-cut protecting contactor is controlled by a power supply which is not the same as one of said energy-saved devices 1'. The input voltage of said power-cut protecting contactor can be 380V or 220V, for example. The current through the contacts of said power-cut protecting contactor is 1.5 times more than the general current of said energy-saved device 1'.

To reduce the over-current while the capacitor is turned on again in a short amount of time after said capacitor was cut off, the resistance or the inductance load can be connected in series to the capacitor in the cut-off state with the normally closed on-off contact of the contactor, which form a ring circuit to relieve the electricity.

Figure 6:
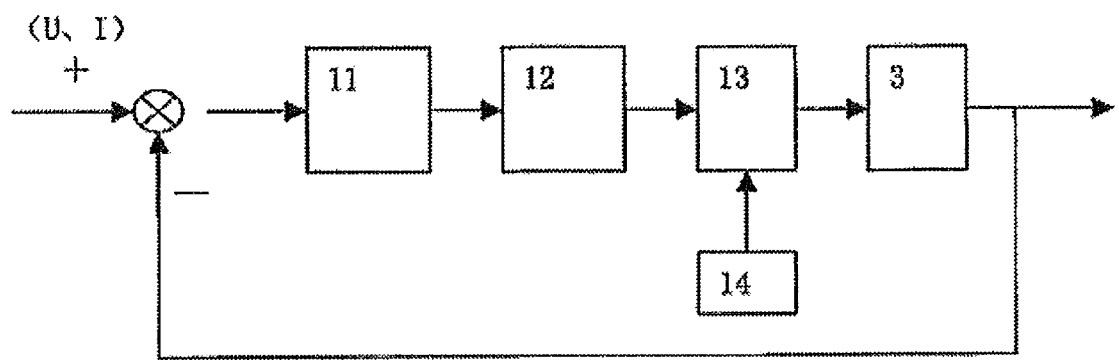
FIG. 6 is the schematic diagram of the intelligent reactive power compensation regulator.

With reference to FIG. 6, the schematic diagram of said intelligent reactive power compensation regulator is shown. Said intelligent reactive power compensation regulator 1 includes a signal processing module 11, a power factor measure module 12, a distributing output module 13 and a protect control module 14; said signal processing module 11, said power factor measure module 12 and said distributing output module 13 are connected in sequence, and are thereafter connected to said capacitor banks 3; and said distributing output module 13 is connected to said protecting control module 14; the outer signal is inputted from said signal processing module 11, and output to said capacitor banks 3 from said distributing output module 13; a feedback branch circuit will connect to the input port of said signal processing module 11 from said capacitor banks 3, to correct the outer signal which enters into said signal processing module 11.

Said signal processing module 11 processes the sampling voltage signal and the sampling current signal respectively, and acquires the voltage volume signal and the current volume signal; said sampling voltage signal and sampling current signal are rectified and are trimmed wave, to form the voltage signal and the current signal in the square wave type.

Said power factor measure module 12 begins count using a high speed counter from the rising edge or trailing edge of the voltage wave signal, to the rising edge or trailing edge of the current wave signal, and combine the data counted and the counting rate to convert into the power factor; said power factor measure module 12 measures the volume of the voltage and the current according to the voltage volume signal and the current volume signal; and convert into the reactive power volume and reactive current volume according to the relation of the power factor and the volume of the voltage and the current. The goal volume of the power factor is considered as a middle volume between the maximum and the minimum of the power factor. To reduce the frequent adjusting for the output state, the goal volume of power factor can select a range between the maximum and the minimum of the power factor, and can be represented as "±" difference to the actual middle volume.

Said distributing output module 13 controls the output according to a setting power factor, the maximum and minimum of the reactive power or the reactive current, and the delay time and the setting control object (the capacitor banks being controlled by "0" voltage switch can be controlled in short time delay or real time type). The reactive power volume or the reactive current volume is distributed appropriately according to the states of output memory and the reactive power volume or the reactive current volume corresponding with the capacitance of every branch capacitor bank; the output state will be kept as required while the capacitor banks have been turned on, or the output will be refreshed respectively as required; the output will be adjusted and achieve a goal volume by changing the capacitance of the capacitor which has been turned on. The output port modes of said distributing output module 13 include (1) the AC contactor winding; (2) the transistor zero volt switch; (3) the complex of the AC contactor winding and the transistor zero volt switch; the output mode is as follows: when the same branch capacitor bank is turned on, first, the transistor zero volt switch is turned on, and then the AC contactor will be turned on and work; when the same branch capacitor bank is cut off, first, the AC contactor is cut off, and then the transistor zero volt switch will be cut off. The advantage of this mode is that the transistor zero volt switch is operated when same branch capacitor bank is turned on and is cut off, to reduce the impact and the oscillation, the AC contactor work during the running period, which reduces the electrical potential difference and losses of the resistance, and also reduces the heating in the transistor zero volt switch and the load of the cooled system (4) connected to the capacitor banks directly.

Said protecting control module 14 controls said distributing output module to provide over-voltage protection, short-voltage protection and over-current protection according to a setting protection volume of the voltage and the current. Said power factor measure module 12, said distributing output module 13 and said protecting control module 14 can be replaced by PLC or a computer, and can realize the distant surveillance.

The branch capacitor control contactor 2 can select a 380V or a 220V input voltage, the rated operating current is at least 1.5 times more than the operating current of the capacitor banks. The branch capacitor control contactor 2 includes the on-off contacts 20 and the windings 21. The windings 21 are connected to a live wire of the power supply while the input voltage of said contactor 2 is 380V; the windings 21 are connected to a zero phase line of the power supply while the input voltage of said contactor 2 is 220V. There are ten sets of the branch capacitor control contactors 2 in this embodiment.

Figure 5:
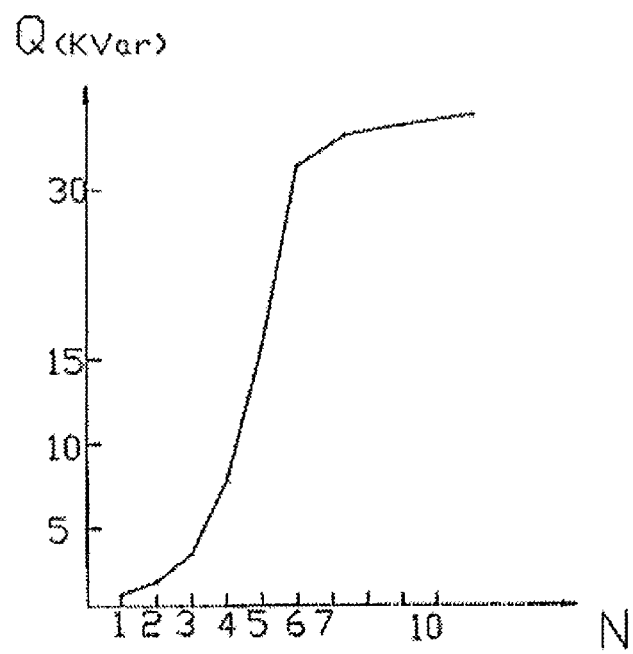
FIG. 5 is the capacitance graph of the present invention.

The capacitor banks 3 include a first stage-one capacitor bank and a second stage-one capacitor bank. The capacitor banks 3 are connected to the power supply through the on-off contacts 20 of the branch capacitor control contactors. In this embodiment, the first stage-one capacitor bank includes six branch stage-two capacitor banks from C1 to C6, the capacitance of which is increased by degrees, each stage-two capacitor bank includes three capacitors in parallel connection and the same capacitance, the capacitance of an after-branch stage-two capacitor bank is two times as much as the capacitance of a former-branch stage-two capacitor bank. This means that the progression of the $(N-1)^{th}$ power of 2 as a grads (here N=1~6) is formed between the capacitance of every branch capacitor banks. FIG. 5 is the progression grads graph of the capacitance of the capacitor (banks) (is also called the capacitance graph).

The second capacitor bank include 4 branch stage-two capacitor banks from C7 to C10 with the same capacitance, each stage-two capacitor bank includes three capacitors in parallel connection and having the same capacitance, the capacitance of the capacitor banks from C7 to C10 is two times as much as the capacitance of the capacitor bank C6. However the capacitance of the capacitor banks from C7 to C10 can be determined by decreasing progression (or same progression) according to the capacitance grads.

The progression grads graph of the capacitance of the capacitor (banks) signify that the capacitors (banks) are divided into two groups according to the capacitance. The progression of the first capacitor bank is scaled up quickly, as the capacitor is arrayed from smaller to larger capacitance. The capacitance of an after-branch capacitor (bank) is two times as much as the capacitance of a former-branch, i.e. the progression of the capacitance is scaled up by $2^{(n-1)}$ (n=1, 2, 3, 4, 5, 6 . . . ) which is the consecutive multiple (1, 2, 4, 8, 16, 32 . . . ) (for example, for 10 outputs, $2^{10}-1=1023$). The progression of a second capacitor bank is scaled down by degrees: the capacitance progression of the last several stage capacitor banks is scaled down by degrees (or equation), and the capacitance is one to two times as much as the maximum of capacitance of a capacitor in the first capacitor banks.

The capacitance progression of the first capacitor bank is scaled up quickly, which is to achieve enough consecutive multiple and increase the adjusting precision. The capacitance progression of the second capacitor bank is scaled down by degrees (or an equation), which is to reduce the oscillation for electricity networks when the big capacitance capacitor banks are turned on or cut off.

While the progression of the first capacitor bank is over two times, it is feasible if said progression is slightly over two times, because there is a factor of "an obtuse angle" when cos φ is close to 1, and the difference between the positive angle and the negative angle (leading and retarding) is two times, the compensation capacitance is increased by degrees. But if said progression is over twice times by a lot, it is called a critical point, or called the critical curve. For example, if it is 3 times, there is not the consecutive amplification multiple, the consecutive adjusting compensation can not be realized.

While the progression of the first capacitor bank is less than two times: it is feasible if said progression is between two times and one time. If there only are the consecutive multiples including to the integer multiple, non-integer multiple and non-regular multiple, the consecutive adjusting compensation can be realized. If the progression is close to two times, it will be easy to achieve enough consecutive multiples and realize the consecutive adjusting compensation. Since the progression of binary digit is twice times, we select the two times so that we can be easy to make automatic control and to set up the capacitance of the second capacitor banks.

While the progression is less than one time: it will return to other explanation in mentioned mode, so we will not describe it any more.

Therefore, when the range of the progression will be one to two times, it is better to be close to two times.

We can define how many branches the first capacitor bank and the second capacitor bank have respectively, according to the adjusting precision required. For example, the first capacitor bank is 6 branches in the total 10 branches. The other 4 branches belong to the second capacitor bank, the result for calculation is $2^6-1+2^6 \times 4=319$ (times), to signify that the total capacitance of 10 branches capacitor banks are divided 319 parts to adjust and compensate the volume reactive.

The adjusting precision=1/multiplex100%

However the capacitor banks 3 can also consist of a plurality of capacitor banks with the same capacitance, each capacitor bank including three capacitors in parallel connection and having the same capacitance. Said stage-two capacitor banks can adopt in delta type parallel connection or star type parallel connection. Said stage-two capacitor banks can be replaced by the single capacitors.

In order to install the capacitor (banks) with small capacitance easily, we can combine a plurality of capacitor banks according to the different capacitance to form a plurality of branch capacitors (banks) integrated units.

Said stage-two capacitor banks can be replaced by the single capacitors.

The cases of the capacitors have to be grounded when the input voltage is 380v and the capacitors adopt in delta type parallel connection, and the midline of the capacitors are connected to a zero phase line and the cases of the capacitors are grounded when the input voltage is 220v and the capacitors adopt a star type parallel connection.

In this embodiment, it uses an external current transformer 4 whose spec is A/5A, A is the maximum current of main switch 5, the secondary maximum current of the current transformer 4 is 5 amp. The external current transformer 4 is ringed around a live wire of the power supply, and the current transformer secondary on the power supply bus can be connected in series to the input port of the sampling current in an intelligent reactive power compensation regulator 1.

TABLE 1

|      | 0.80 | 0.82 | 0.84 | 0.86 | 0.88 | 0.90 | 0.92 | 0.94 | 0.96 | 0.98 | 1.00 |
|------|------|------|------|------|------|------|------|------|------|------|------|
| 0.40 | 1.54 | 1.60 | 1.65 | 1.70 | 1.75 | 1.81 | 1.87 | 1.93 | 2.00 | 2.00 | 2.29 |
| 0.42 | 1.41 | 1.47 | 1.52 | 1.57 | 1.62 | 1.68 | 1.74 | 1.80 | 1.87 | 1.96 | 2.16 |
| 0.44 | 1.29 | 1.34 | 1.39 | 1.44 | 1.50 | 1.55 | 1.61 | 1.68 | 1.75 | 1.84 | 2.04 |
| 0.46 | 1.18 | 1.23 | 1.28 | 1.34 | 1.39 | 1.44 | 1.50 | 1.57 | 1.64 | 1.73 | 1.93 |
| 0.48 | 1.08 | 1.12 | 1.18 | 1.23 | 1.28 | 1.34 | 1.4. | 1.46 | 1.54 | 1.62 | 1.83 |
| 0.50 | 0.98 | 1.04 | 1.09 | 1.14 | 1.19 | 1.25 | 1.31 | 1.37 | 1.44 | 1.53 | 1.73 |
| 0.52 | 0.89 | 0.94 | 1.00 | 1.05 | 1.10 | 1.16 | 1.21 | 1.28 | 1.35 | 1.44 | 1.64 |
| 0.54 | 0.81 | 0.86 | 0.91 | 0.97 | 1.02 | 1.07 | 1.13 | 1.20 | 1.27 | 1.36 | 1.56 |
| 0.56 | 0.73 | 0.78 | 0.83 | 0.89 | 0.94 | 0.99 | 1.05 | 1.12 | 1.19 | 1.28 | 1.48 |
| 0.58 | 0.66 | 0.71 | 0.76 | 0.81 | 0.87 | 0.92 | 0.98 | 1.04 | 1.12 | 1.20 | 1.41 |
| 0.60 | 0.58 | 0.64 | 0.69 | 0.74 | 0.79 | 0.85 | 0.91 | 0.97 | 1.04 | 1.13 | 1.33 |
| 0.62 | 0.52 | 0.57 | 0.62 | 0.67 | 0.73 | 0.78 | 0.74 | 0.90 | 0.98 | 1.06 | 1.27 |
| 0.64 | 0.45 | 0.50 | 0.58 | 0.61 | 0.66 | 0.72 | 0.77 | 0.84 | 0.91 | 1.00 | 1.20 |
| 0.66 | 0.39 | 0.44 | 0.49 | 0.55 | 0.60 | 0.65 | 0.71 | 0.78 | 0.85 | 0.94 | 1.14 |
| 0.68 | 0.33 | 0.38 | 0.43 | 0.48 | 0.54 | 0.59 | 0.65 | 0.71 | 0.79 | 0.88 | 1.08 |
| 0.70 | 0.27 | 0.32 | 0.38 | 0.43 | 0.48 | 0.54 | 0.59 | 0.66 | 0.73 | 0.82 | 1.02 |
| 0.72 | 0.21 | 0.27 | 0.32 | 0.37 | 0.42 | 0.48 | 0.54 | 0.60 | 0.67 | 0.76 | 0.96 |
| 0.74 | 0.16 | 0.21 | 0.26 | 0.31 | 0.37 | 0.42 | 0.48 | 0.54 | 0.62 | 0.71 | 0.91 |
| 0.76 | 0.10 | 0.16 | 0.21 | 0.26 | 0.31 | 0.37 | 0.43 | 0.49 | 0.56 | 0.65 | 0.85 |
| 0.78 | 0.05 | 0.11 | 0.16 | 0.21 | 0.26 | 0.32 | 0.38 | 0.44 | 0.51 | 0.60 | 0.80 |
| 0.80 |      | 0.05 | 0.10 | 0.16 | 0.21 | 0.27 | 0.32 | 0.39 | 0.46 | 0.55 | 0.75 |
| 0.82 |      |      | 0.05 | 0.10 | 0.16 | 0.21 | 0.27 | 0.34 | 0.41 | 0.49 | 0.70 |
| 0.84 |      |      |      | 0.05 | 0.11 | 0.16 | 0.22 | 0.28 | 0.35 | 0.44 | 0.65 |
| 0.86 |      |      |      |      | 0.05 | 0.11 | 0.17 | 0.23 | 0.30 | 0.39 | 0.59 |
| 0.88 |      |      |      |      |      | 0.06 | 0.11 | 0.16 | 0.25 | 0.34 | 0.54 |
| 0.90 |      |      |      |      |      |      | 0.06 | 0.12 | 0.19 | 0.28 | 0.49 |

The capacitor banks should be selected according to the power factor of the equipment and the power factor required. The table (1) is the reactive capacitance of the capacitor being compensated per 1 KW active power. The data on the table (1) is obtained base on the 50 Hz frequency. If the frequency is changed to 60 Hz, all relative data will be 1.2 times as much as the data on the table (1).

The first column on the table (1) represents the power factor of the equipment, the first row on the table (1) represents the power factor required, the data on the intersection of the first column and the first row is the capacitance of the capacitor which is in parallel connection, and the unit of said data is kilovar.

The expression of unit kilovar and unit microfarad is as following:

Capacitance $X_c = 1/\omega C = 1/2\pi f C$

C—capacitor ω—angle frequency $KUar(\text{kilovar}) = U(v) \times I(\text{amp}) \times 10^{-3}$ $= U \times U/X_c \times 10^{-3}$ $= U^2 \times \omega C(\text{farad}) \times 10^{-3}$ $= U^2 \times 2\pi f C(\text{microfarad}) \times 10^{-9}$ Principle of Operation of the Present Invention First, the energy-saved device 1' compares and analyzes the sampling current and the sampling voltage, producing a phase difference signal (G type) or a reactive current signal (L type). Then the device causes some capacitors (banks) to be turned on and increases the output when said signal was in a minimum level of setting volume, and causes some capacitors (banks) to be cut off and decreases the output when said signal was in maximum level of setting volume. The control circuit in said intelligent reactive power compensation regulator 1 will work when said signal remains after the delay time, and will make the contactor turn on or cut off the capacitor banks seriatim in a circulation work mode being distributed and outputted according to the capacitance of every capacitors (banks). The reactive power produced from the motor of customer equipment is compensated appropriately in the customer general switch. There is a loop for the reactive current between the capacitor banks inside said energy-saved device 1' and the motor. Said energy-saved device 1 stores the electric energy first and then return said electric energy to the motor for working. The inductance load do not derive the reactive current from the power supply.

In this embodiment, the energy-saved device 1' is used for 3 phase 380v reactive power compensation, and is used for the 3 phase 380v customers whose inductance load of 3 phase AC is balance.

In other embodiment, the energy-saved device 1' can be divided into three groups for the single phase 220v reactive power compensation respectively, or can be used for the 3 phase 380v customers whose the inductance load of 3 phase AC is unbalance, or can be made as an independent single phase 220v reactive power compensation for the single phase 220v customers such as for air-conditioners, refrigerators, etc. For example, the single phase 220v capacitors in the single phase 220v customers have been used for said capacitor bands. The other components are the same with the first embodiment, so we will not describe it any more. In addition, when the output of reactive power compensation regulator is increased and the load of said energy-saved device is capacitive, the branch capacitor control contactor can be removed, said reactive power compensation regulator can drive the single phase capacitors working directly, which is suitable for family and business uses.

When the output of said regulator 1 is changed to the voltage signal or the current signal, and control the thyratron transistor, the field effect transistor and power transistor respectively, the AC contactor 2 and its on-off contact 20 can be replaced by the thyratron transistor, the field effect transistor and power transistor.

It should be understood that the present invention is not limited to the embodiment disclosed herein. As the output port of the reactive power compensation regulator of the present invention can be increased discretionarily, the circuit being compensated is increased accordingly. In addition, the capacitance of the capacitor or each sub-stage capacitor bank in said capacitor banks is designed according to the requirement. Two sets of the customer intelligent reactive power automatic compensation energy-saved devices can be used and worked alternatively. Said customer intelligent reactive power automatic compensation energy-saved device can be provided the running recorders, the printing equipments and the trouble alarm. Any non-substantive, obvious alterations or improvement by the technician of this technical field according to the present invention may be incorporated into the ambit of the claims of the present invention.

What is claimed is:

1. A customer intelligent reactive power automatic compensation energy-saved device, wherein said energy-saved device includes an intelligent reactive power compensation regulator, a plurality of branch capacitor control contactors, a plurality of capacitor banks and a current transformer; said intelligent reactive power compensation regulator is provided with a sampling current input, a sampling voltage input, an external AC contactor power bus and a plurality of output control lines, said sampling current input is connected to the current transformer, one end of said sampling voltage input is connected to a live wire of a power supply and the other end is connected to a zero phase line of the power supply, said external AC contactor power bus is connected to a live wire of the power supply, said current transformer is ringed around the live wire of the power supply, said output control lines are connected to the branch capacitor control contactors respective, said capacitor banks are connected to the power supply through the branch capacitor control contactors.

2. A customer intelligent reactive power automatic compensation energy-saved device according to claim 1, wherein said capacitor banks include at least a first stage-one capacitor bank, and said first stage-one capacitor bank includes a plurality of branch stage-two capacitor banks the capacitance of which is increased by degrees.

3. A customer intelligent reactive power automatic compensation energy-saved device according to claim 2, wherein said first stage-one capacitor bank includes a plurality of branch stage-two capacitor banks the capacitance of which is increased by degrees, and the capacitance of an after-branch capacitor bank is once to twice times as much as the capacitance of a former-branch capacitor bank.

4. A customer intelligent reactive power automatic compensation energy-saved device according to claim 2, wherein each stage-two capacitor bank includes three capacitors in parallel connection and same capacitance.

5. A customer intelligent reactive power automatic compensation energy-saved device according to claim 1, wherein said capacitor banks include at least a first stage-one capacitor bank and a second stage-one capacitor bank.

6. A customer intelligent reactive power automatic compensation energy-saved device according to claim 5, wherein said first stage-one capacitor bank includes a plurality of branch stage-two capacitor banks the capacitance of which is increased by degrees, and the capacitance of an after-branch capacitor bank is once to twice times as much as the capacitance of a former-branch capacitor bank.

7. A customer intelligent reactive power automatic compensation energy-saved device according to claim 5, wherein said second stage-one capacitor bank includes a plurality of branch stage-two capacitor banks with same capacitance, the capacitance of said each branch stage-two capacitor bank is once to twice times as much as the maximum of capacitance of each branch stage-two capacitor bank in said first stage-one capacitor bank.

8. A customer intelligent reactive power automatic compensation energy-saved device according to claim 5, wherein said first stage-one capacitor bank includes a plurality of branch stage-two capacitor banks the capacitance of which is increased by degrees, the capacitance of an after-branch capacitor bank is once to twice times as much as the capacitance of a former-branch capacitor bank; said second stage-one capacitor bank includes a plurality of branch stage-two capacitor banks with same capacitance, the capacitance of said each branch stage-two capacitor bank is once to twice times as much as the maximum of capacitance of each branch stage-two capacitor bank in said first stage-one capacitor bank.

9. A customer intelligent reactive power automatic compensation energy-saved device according to claim 8, wherein said first stage-one capacitor bank includes a plurality of branch stage-two capacitor banks the capacitance of which is increased by degrees, the capacitance of an after-branch stage-two capacitor bank is twice times as much as the capacitance of a former-branch stage-two capacitor bank; said second stage-one capacitor bank includes a plurality of branch stage-two capacitor banks with same capacitance, the capacitance of said each branch stage-two capacitor bank is twice times as much as the maximum of capacitance of each branch stage-two capacitor bank in said first stage-one capacitor bank.

10. A customer intelligent reactive power automatic compensation energy-saved device according to claim 8, wherein said capacitor banks include a plurality of stage-one capacitor banks with same capacitance; said stage-one capacitor banks include a plurality of branch stage-two capacitor banks the capacitance of which is increased by degrees.

11. A customer intelligent reactive power automatic compensation energy-saved device according to claim 10, wherein each stage-two capacitor bank includes three capacitors in parallel connection and same capacitance.

12. A customer intelligent reactive power automatic compensation energy-saved device according to claim 11, wherein said stage-two capacitor banks adopt in delta type parallel connection or star type parallel connection.

13. A customer intelligent reactive power automatic compensation energy-saved device according to claim 8, wherein said stage-two capacitor banks are the single capacitors.

14. A customer intelligent reactive power automatic compensation energy-saved device according to claim 8, wherein said customer intelligent reactive power automatic compensation energy-saved device is provided with a power-cut protecting contactor; said power-cut protecting contactor is controlled by a power supply which is not same with one of said energy-saved device; the current through the contact of said power-cut protecting contactor is 1.5 times more than the general current of said energy-saved device.

15. A customer intelligent reactive power automatic compensation energy-saved device according to claim 8, wherein when the output of said regulator is changed to the voltage signal or the current signal, and control the thyratron transistor, the field effect transistor and the power transistor respective, the AC contactor and its on-off contact can be replaced by the thyratron transistor, the field effect transistor and the power transistor.

16. A customer intelligent reactive power automatic compensation energy-saved device according to claim 8, wherein when the output of said reactive power compensation regulator is increased and the load of said energy-saved device is capacitive, the branch capacitor control contactor can be removed, said reactive power compensation regulator can drive the single phase capacitors working directly.

17. A customer intelligent reactive power automatic compensation energy-saved device according to claim 1, wherein said intelligent reactive power compensation regulator includes a signal processing module, a power factor measure module, a distributing output module and a protecting control module; said signal processing module, said power factor measure module and said distributing output module are connected in sequence, thereafter are connected to said capacitor banks; and said distributing output module is connected to said protecting control module; the outer signal is inputted from said signal processing module, and output to said capacitor banks from said distributing output module; a feedback branch circuit will connect to the input port of said signal processing module from said capacitor banks.

18. A customer intelligent reactive power automatic compensation energy-saved device according to claim 17, wherein:
Said signal processing module processes the sampling voltage signal and/or the sampling current signal respectively, and acquire the voltage volume signal and/or the current volume signal, said sampling voltage signal and sampling current signal are rectified and are trimmed wave, to form the voltage signal and the current signal in the square wave type;
Said power factor measure module begins count from the rising edge or trailing edge of the voltage wave signal, to the rising edge or trailing edge of the current wave signal, and combine the data counted and the counting rate to convert into the power factor; said power factor measure module measures the volume of the voltage and the current according to the voltage volume signal and the current volume signal; and convert into the reactive power volume or reactive current volume according to the relation of said power factor and said volume of the voltage and the current;
Said distributing output module controls the output according to a setting power factor, the maximum and minimum of the reactive power or the reactive current, the delay time and the setting control object; the reactive power volume or the reactive current volume is distributed appropriately according to the states of output memory and the reactive power volume or the reactive current volume corresponding with the capacitance of every branch capacitor bank; the output state will be kept as required while the capacitor banks have been turned on, or the output will be refreshed respectively as required; the output will be adjusted and achieve a goal volume by changing the capacitance of the capacitor which is turned on; and
Said protecting control module controls said distributing output module to make the over-voltage protection, short-voltage protection and over-current protection according to a setting protection volume of the voltage and the current.

\* \* \* \* \*